Patented July 1, 1952

2,602,040

UNITED STATES PATENT OFFICE 2,602,040

ENTERIC COATED SYMPATHOLYTIC COMPOSITION

Louis Sanford Goodman and Mark Nickerson, Salt Lake City, Utah, assignors to The Givaudan Corporation, New York, N. Y., a corporation of New Jersey No Drawing. Application June 28, 1949, Serial No. 101,914

6 Claims. (Cl. 167—65)

This invention relates to novel sympatholytic and adrenolytic compositions having specificity of action and being relatively non-toxic.

In our co-pending application, Serial No. 645,961, filed February 6, 1946, Patent No. 2,537,988, we disclosed a series of novel sympatholytic and adrenolytic agents. These novel agents can be represented by the following general structural formula:

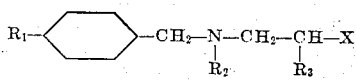

wherein $R_1$ is a member selected from the group consisting of H and $CH_3$, $R_2$ is a member selected from the group consisting of H, alkyl, aryl, aralkyl and haloalkyl radicals, $R_3$ is a member selected from the group consisting of H and $CH_3$, and X is a halogen selected from the group consisting of chlorine and bromine; salts of said compounds with organic and inorganic acids; and quaternary ammonium salts of said compounds.

As disclosed in our co-pending application, Serial No. 645,961, the novel sympatholytic and adrenolytic agents may be employed in the form of tablets, made by incorporation of inert carriers in the active ingredients, capsules, solutions, etc. When so employed, our novel sympatholytic and adrenolytic compositions have an unique therapeutic effect as indicated by paralysis of the adrenergic excitatory effector cells. For example, the pupils become constricted, the peripheral vessels dilate if sympathetically constricted, the heart and blood vessels do not respond as before to sympathetic nerve impulses or to administered epinephrine, etc.

While our novel sympatholytic and adrenolytic agents have been found, as aforesaid, to have unusual physiological effects, certain undesirable side effects have been noted. In this connection nausea, vomiting, and other gastro-intestinal manifestations sometimes have been observed, whether the novel sympatholytic and adrenolytic agents are administered orally or intraparenterally. We have by our present invention succeeded in materially lowering the incidence of such side effects by providing an enteric coating for our novel sympatholytic and adrenolytic agents, whereby the agents are permitted to pass through the stomach with substantially no disintegration and thereafter dissolve in the intestines.

We have found that, in general, the coating may include any non-toxic resin or balsam which is insoluble in an acid medium and soluble in an alkaline medium. The resin may be applied in known manner, for example in a liquid phase (that is, either melted or in solution). After the resin coating has been built upon the tablet to the desired thickness it is dusted with talcum and dried. Among the suitable enteric coatings may be noted shellac, phenyl salicylate, balsam of Tolu, keratin, shellac in strong borax solution, stearic acid and spermaceti, and formalized gelatin.

In order to illustrate our invention more fully but without thereby limiting it the following examples in which enteric coatings are applied to dibenzyl beta-chloroethylamine hydrochloride are given. It will be understood that in place of dibenzyl beta-chloroethylamine hydrochloride other novel sympatholytic and adrenolytic agents may be employed.

*Preparation of dibenzyl beta-chloroethylamine hydrochloride*

To 610 grams of monoethanolamine, 1265 grams of benzyl chloride are added under stirring during five hours at a temperature of 100°–110° C. Stirring and heating at 100°–110° C. is continued for five more hours.

After cooling to about 70° C., a solution of 400 grams of sodium hydroxide in 600 cc. of water was gradually added under stirring and the mixture was heated in a boiling water bath for one hour. After cooling to room temperature, the contents were extracted with 800 cc. of benzene. The benzene solution was separated, washed with 1000 cc. of water, dried with anhydrous sodium sulfate and filtered. The benzene was removed by distillation first under atmospheric pressure to a temperature of 90° C., and finally under vacuum of about 30 mm. mercury to about 100° C. The residual oil was then distilled at a vacuum of 5 mm. mercury and 848 grams of the desired material, boiling at 185°–192° C., were obtained. The liquid solidified on standing to a crystalline solid, congealing at 43° C.

A solution of 482 grams of dibenzyl aminoethanol in 500 cc. of chloroform was cooled in an ice bath and under stirring, a solution of 276 grams of thionyl chloride in 300 cc. of chloroform was added during two hours. Stirring was then continued for three hours under cooling. The reaction mixture was allowed to stand over night. The chloroform was distilled off under atmospheric pressure except near the end when vacuum was employed, and the crystalline mass was recrystallized from 700 cc. of ethanol containing 10 grams of decolorizing carbon. After filtration, 410 grams of white crystals of dibenzyl beta-chloroethylamine hydrochloride, melting at 194°–195° C. were obtained; addition of ether to the mother liquor yielded a second crop of 90 grams (melting point 192°–194° C.).

*Example 1*

Enteric-coated tablets containing two grains of dibenzyl beta-chloroethylamine hydrochloride were prepared by coating centers composed of dibenzyl beta-chloroethylamine hydrochloride, milk sugar, corn starch, magnesium stearate, and powdered sugar with an enteric coating, in accordance with procedures well-known to pharmacy.

The enteric-coated dibenzyl beta-chloroethylamine hydrochloride tablets had the following composition:

|  | Grams |
|---|---|
| Weight of centers, per 1000 | 259.201 |
| Weight of coating, per 1000 | 251.426 |

| Materials | Amount per 1000 | Amount per tablet | Percent per tablet |
|---|---|---|---|
|  | gms. | gms. |  |
| Dibenzyl beta-chloroethylamine hydrochloride. | 129.5975 | 0.12959 | 50.000 |
| Milk sugar USP | 102.0952 | 0.10209 | 39.3884 |
| Corn starch USP | 11.9846 | 0.01198 | 4.6226 |
| Magnesium stearate USP | 2.5714 | 0.00257 | 0.992 |
| Powdered sugar | 12.9523 | 0.01295 | 4.997 |
| Total | 259.201 | 0.2592 | 100.000 |

COATING

| Gelatin USP | 1.394 | 0.00139 | 0.5544 |
|---|---|---|---|
| Acacia USP | 2.4322 | 0.00243 | 0.9673 |
| Glycerin USP | 0.673 | 0.00067 | 0.2676 |
| Calcium carbonate USP | 47.4367 | 0.04743 | 18.8676 |
| Sugar USP | 169.5632 | 0.16956 | 67.4405 |
| Corn Starch USP | 23.7184 | 0.02371 | 9.4335 |
| Carnauba wax | 0.2505 | 0.00025 | 0.0996 |
| Orang #1 FD&C | 0.5 | 0.0005 | 0.1988 |
| Confectioner's Glaze #4 (Solids) | 2.493 | 0.00249 | 0.9915 |
| Balsam Tolu (Solids) | 2.965 | 0.00296 | 1.1792 |
| Total | 251.426 | 0.25142 | 100.0000 |

*Example 2*

Enteric-coated tablets containing four grains of dibenzyl beta-chloroethylamine hydrochloride were prepared by coating centers composed of dibenzyl beta-chloroethylamine hydrochloride, milk sugar, corn starch, magnesium stearate, and powdered sugar with an enteric coating, in accordance with procedures well-known to pharmacy.

The enteric-coated dibenzyl beta-chloroethylamine hydrochloride tablets had the following composition:

|  | Grams |
|---|---|
| Weight of centers, per 1000 | 375.842 |
| Weight of coating, per 1000 | 377.786 |

| Materials | Amount per 1000 | Amount per tablet | Percent per tablet |
|---|---|---|---|
|  | gms. | gms. |  |
| Dibenzyl beta-chloroethylamine hydrochloride. | 259.195 | 0.25919 | 68.9638 |
| Milk sugar USP | 78.3142 | 0.07831 | 20.8372 |
| Powdered sugar | 17.8095 | 0.0178 | 4.7385 |
| Corn Starch USP | 19.19 | 0.01919 | 5.1058 |
| Magnesium stearate USP | 1.3333 | 0.00133 | 0.3547 |
| Total | 375.842 | 0.37582 | 100.0000 |

COATING

| Gelatin USP | 1.72 | 0.00172 | 0.4552 |
|---|---|---|---|
| Glycerin USP | 1.05 | 0.00105 | 0.2779 |
| Acacia USP | 3.5318 | 0.00353 | 0.9348 |
| Calcium Carbonate USP | 81.055 | 0.08105 | 21.4557 |
| Sugar USP | 244.0778 | 0.24407 | 64.6074 |
| Starch USP | 40.5274 | 0.04052 | 10.7276 |
| Carnauba wax | 0.415 | 0.00041 | 0.1098 |
| Tartarazine FD&C Yellow | 0.2 | 0.0002 | 0.0529 |
| Sunset yellow (certified) | 0.24 | 0.00024 | 0.0635 |
| Confectioner's Glaze #4 (solids) | 3.116 | 0.00311 | 0.8248 |
| Balsam Tolu (solids) | 1.853 | 0.00185 | 0.4904 |
| Total | 377.786 | 0.37778 | 100.0000 |

*Example 3*

Compressed tablets having the following composition were prepared:

| Materials: | Grams per tablet |
|---|---|
| Dibenzyl beta-chloroethylamine hydrochloride | 0.1365 |
| Imported terra alba | 0.2207 |
| Powdered sugar USP | 0.0500 |
| Corn starch | 0.0100 |
| Stearic acid | 0.0040 |

The tablets were prepared by mixing dibenzyl beta-chloroethylamine hydrochloride, imported terra alba and powdered sugar and screening these materials, followed by granulating them in known manner with a gelatin solution. The granules were dried at 130° F. over night and then screened. A corn starch and stearic acid were screened and sifted onto the dry granules and after mixing the tablets were prepared in the usual manner.

An enteric coating solution was prepared having the following composition:

| Materials: | Parts by weight |
|---|---|
| Ethyl acetate | 5.4 |
| Ethyl alcohol | 5.4 |
| Ethyl lactate | 1.6 |
| Cellulose acetate-phthalate (Eastman-Kodak type S–1) | 1.2 |

The cellulose acetate-phthalate coating solution was applied over the rotating tablets and the contents were mixed. When the tablets were thoroughly wetted with the solution a blast of warm air (120°–130° F.) was blown over the tablets until the coating was dry. No odor of solvent was present after this drying period. This coating procedure was repeated twenty to twenty-five times. After this treatment each tablet weighed approximately 0.455 gram.

If desired, further operations such as smoothing, polishing, coloring, etc. may be applied in known manner.

*Example 4*

Capsules were prepared in known manner by using a mixture of 65 parts by weight of the sodium salt of polyvinyl phthalate and 35 parts by weight of gelatin and 5 parts by weight of water. The polyvinyl phthalate itself had a 60 per cent polyvinyl content and 2 per cent acetyl content. The capsules were filled with 0.4212 gram of the following composition:

| Materials: | Grams per tablet |
|---|---|
| Dibenzyl beta-chloroethylamine hydrochloride | 0.1365 |
| Imported terra alba | 0.2207 |
| Powdered sugar USP | 0.0500 |
| Corn starch | 0.0100 |
| Stearic acid | 0.0040 |

The composition was not tableted but was inserted into the capsule in loose powder form. The usual wax coating was applied over the capsule until there had been a gain of 2 to 5 per cent of the weight of the capsule. If desired, further operations such as smoothing, polishing, etc. may be employed in accordance with known procedures.

The resulting enteric capsules can be employed orally for therapeutic purposes.

Among other specific examples of sympatholytic and adrenolytic agents which may be employed in accordance with our present invention are dibenzyl - beta - chloroethylamine, di-paramethyl benzyl-beta-chloroethylamine hydrochloride, benzyl ethyl-beta-chloroethylamine hydrochloride, benzyl ethyl-beta-chloroethylamine, dibenzyl-beta-chloropropylamine hydrochloride, dibenzyl-beta-chloropropylamine, benzyl di-beta-chloroethylamine hydrochdoride, benzyl di-beta-chloroethylamine, di-benzyl-beta-bromoethylamine hydrobromide, di-benzyl-beta-bromoethylamine, dibenzyl-beta-chloroethyl-methyl ammonium methosulfate, dibenzyl-beta-bromoethyl methyl ammonium methosulfate, benzyl di-beta-chloroethyl methyl ammonium methosulfate, benzyl-ethyl-beta-chloroethyl methyl ammonium methosulfate and dibenzyl-beta-chloropropyl methyl ammonium methosulfate. Details covering the preparation and properties of the foregoing compounds are given in our aforesaid copending patent application, Serial No. 645,961.

The foregoing illustrates the practice of this invention, which however, is not to be limited thereby but is to be construed as broadly as permissible in view of the prior art and limited solely by the appended claims.

We claim:

1. A therapeutic composition having an enteric coating thereon comprising a solid, non-toxic, inert resin-containing carrier, and as an active sympatholytic and adrenolytic agent, at least one material selected from the group consisting of substances having the following general structural formula:

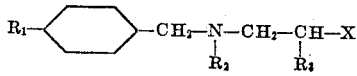

wherein $R_1$ is a member selected from the group consisting of H and $CH_3$, $R_2$ is a member selected from the group consisting of H, alkyl, aryl, aralkyl and haloalkyl radicals, $R_3$ is a member selected from the group consisting of H and $CH_3$, and X is a halogen selected from the group consisting of chlorine and bromine; salts of said compounds with organic and inorganic acids; and quaternary ammonium salts of said compounds.

2. A therapeutic composition having an enteric coating thereon comprising a solid, non-toxic, inert resin-containing carrier, and as an active sympatholytic and adrenolytic agent, dibenzyl-beta-chloroethylamine hydrochloride.

3. A therapeutic composition having an enteric coating thereon comprising a solid, non-toxic, inert, resin-containing carrier, and as an active sympatholytic and adrenolytic agent, di-para-methyl benzyl-beta-chloroethylamine hydrochloride.

4. A therapeutic composition having an enteric coating thereon comprising a solid, non-toxic, inert, resin-containing carrier, and as an active sympatholytic and adrenolytic agent, benzyl ethyl-beta-chloroethylamine hydrochloride.

5. A therapeutic composition having an enteric coating thereon comprising a solid, non-toxic, inert, resin-containing carrier, and as an active sympatholytic and adrenolytic agent, dibenzyl-beta-chloropropylamine hydrochloride.

6. A therapeutic composition having an enteric coating thereon comprising a solid, non-toxic, inert, resin-containing carrier, and as an active sympatholytic and adrenolytic agent, di-benzyl-beta-bromoethylamine hydrobromide.

LOUIS SANFORD GOODMAN.
MARK NICKERSON.

REFERENCES CITED

The following references are of record in the file of this patent:

UNITED STATES PATENTS

| Number | Name | Date |
| --- | --- | --- |
| 2,196,768 | Hiatt | Apr. 9, 1940 |

FOREIGN PATENTS

| Number | Country | Date |
| --- | --- | --- |
| 538,456 | Germany | Nov. 13, 1931 |
| 550,762 | Germany | May 20, 1932 |

OTHER REFERENCES

Rockwell, Psychosomatic Medicine, vol. 10, July-Aug. 1948, pages 230 to 237.

Hecht, American Journal of Medicine, July 1947, pages 3 to 17.